Dec. 7, 1926.  
F. N. MARTIN  
ICE CREAM DIPPER  
Filed Feb. 26, 1925  
1,609,655

Fred N. Martin, Inventor

By Herbert E. Smith, Attorney

Patented Dec. 7, 1926.

1,609,655

UNITED STATES PATENT OFFICE.

FRED N. MARTIN, OF SPOKANE, WASHINGTON.

ICE-CREAM DIPPER.

Application filed February 26, 1925. Serial No. 11,778.

My present invention relates to improvements in ice-cream dippers for use in dipping or scooping an accurate and predetermined quantity of ice cream from a bulk and subsequently ejecting the measured quantity or molded portion of ice cream for dispensing in plates, cones, or other receptacles.

The primary object of the invention is the provision of a device of this character which is simple in construction and operation, which is composed of a minimum number of parts for the performance of its required functions and which will automatically measure and mold the predetermined quantity of ice cream without waste of the material.

By the utilization of the device of my invention the required quantity of ice cream may be dipped from the freezer and deposited in a cone, plate or other receptacle with facility and convenience.

The invention consists in certain novel combinations and arrangements of parts as will hereinafter be more fully pointed out and claimed.

In the accompanying drawings I have illustrated one complete example of the physical embodiment of my invention wherein the parts are combined and arranged according to the best mode I have thus far devised for the practical application of the principles of my invention.

Figure 1:
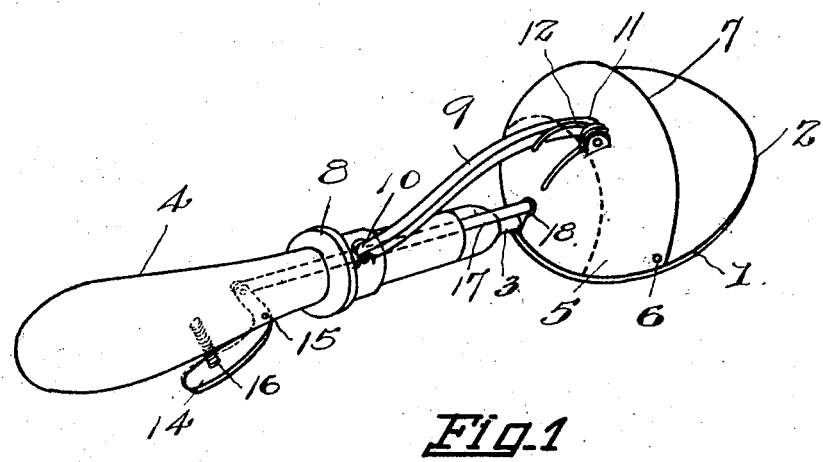
Figure 1 is a perspective view of an implement embodying my invention.

In carrying out my invention I utilize a blade 1 of substantial thickness and standard size. This blade is preferably of approximate circular shape and flat and its front edge 2 is beveled or sharpened on its underside in order that the blade may be plunged or shoved into the bulk of cream in the freezer to penetrate the required distance therein. By means of its shank 3 the blade is rigidly secured at the end of the wood handle 4 which handle is of proper size and shape for facile manipulation when dishing out the ice cream.

On the top, flat, portion of the blade is carried an arcuate cutting shell 5 shaped like a quarter of a sphere and preferably made of sheet metal. The cutting shell is pivoted at 6, 6, on a line transverse to the longitudinal axis of the implement, and the front curved edge 7 of the shell is beveled to form a cutting edge for penetrating the ice cream.

Figure 2:
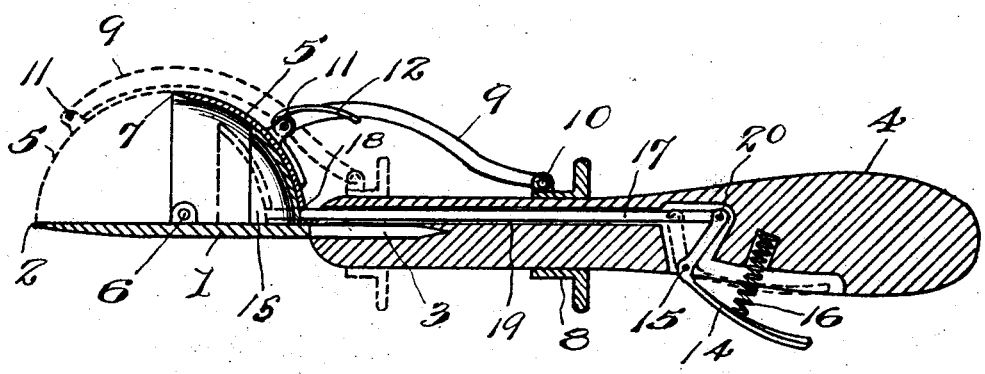
Figure 2 is a longitudinal sectional view of the implement showing in dotted lines the operation of the cutting shell and also the operation of the ejector.

In its normal position as shown in full lines in Figures 1 and 2 the cutting shell covers the rear half of the blade 1 and acts as a receptacle and abutment for the ice cream as the blade is plunged in the bulk of ice cream in the freezer. After the blade 1 has been plunged into the ice cream the cutting shell is adapted to swing on its pivots and sever or cut the gathered portion of ice cream and mold it to shape preparatory to ejecting the molded quantity from the dipper.

For accomplishing this forward and rear swinging movement of the cutting shell I employ a slide collar 8 fitting loosely around the handle 4, and a link 9 which is pivoted at one end 10 to the slide collar and at its other end 11 is pivoted in perforated ears on the exterior of the cutting shell. The link extends longitudinally of the implement and is arched as shown to permit freedom of movement of the swinging shell when the slide collar is pushed forward on the handle, and a spring 12 is interposed between the link and shell to return or assist in returning the shell to its normal rearward position, as shown.

It will be apparent that after the blade has been plunged into the bulk of ice cream and a quantity of ice cream has been forced back into the shell for molding it, by a push from the thumb on the slide sleeve or collar, the cutting shell will be made to swing on its pivots to cut with its front cutting edge the gathered quantity of ice cream, and at the same time complete the molding of the hemispherical quantity of ice cream gathered from the bulk.

With the shell in its forward position the implement is then withdrawn from the freezer, the molded quantity being supported in the shell, and this molded quantity is ready to be dispensed as desired. Before ejecting the molded quantity of ice cream from the dipper, the shell of course is permitted to swing on its pivot to rear position, by action of the spring 12, leaving the front portion of the shell open for ejection of the ice cream therefrom.

For ejecting the gathered portion of ice cream from the dipper I utilize a push plate or ejector 13 which is shaped to conform to the shell and is located within the shell at the rear of the blade. When the cutting shell is being operated to cut the ice cream this plate forms an abutment against which the ice cream is forced by the action of the shell to mold a compact portion of the ice cream and preserve the shape of this portion of ice cream.

This plate which is in the form of the segment of a sphere is normally located within the cutting shell on top of the blade and it is adapted to reciprocate across the face of the blade as shown by dotted lines in Figure 2.

For actuating the ejector or push plate, I utilize an angular or L-shaped lever 14 which is pivoted at 15 in a suitable recess or socket in the handle and at its underside, and the lever is normally held extended from the handle by means of a spring 16 interposed between the handle and lever for the purpose.

A reciprocable ejector rod 17 is rigidly fixed at the rear end of the ejector plate and extends through a slot 18 in the shell 5. This rod is reciprocable in the longitudinal socket or bore 19 of the handle and is pivoted at 20 to the L-shaped lever.

It will be obvious that by pressing the lever inwardly toward the handle, the ejector plate will be pushed across the flat top of the blade as indicated by dotted lines in Figure 2 and the molded quantity of ice cream will be ejected through the front opening of the shell. When the pressure on the lever 14 is released, the spring 16 which has previously been compressed, expands and returns the ejector plate to normal position for subsequent use of the dipper.

From the above description taken in connection with my drawings it will be apparent that I have provided an implement of this type which may be operated with facility for the purpose of fashioning a well-formed portion of ice cream in predetermined quantity and substantially without waste of the material.

Having thus fully described my invention what I claim as new and desire to secure by Letters Patent is—

1. In an ice cream dipper the combination with a blade formed in a plane surface and a handle, of a cutting shell shaped in the quadrant of a sphere pivoted transversely of the blade, means for operating said cutting shell, and an ejector device adapted to act as an abutment during the cutting operation of said shell.

2. In an ice cream dipper the combination of a blade and handle rigidly connected, a cutting shell pivoted transversely of the blade, a slide collar on the handle and a link connecting said collar and shell, and an ejector device adapted to act as an abutment during the cutting operation of the shell.

3. In an ice cream dipper the combination with a rigid blade formed in a plane surface and a handle, of a cutting shell shaped in the quadrant of a sphere pivoted transversely of the blade, means for operating said cutting shell, and an abutment at the rear of the blade for co-action with the shell during the cutting operation of the latter, curved in conformity with said shell.

4. In an ice cream dipper the combination with a rigid blade formed in a plane surface and a handle, of a shell shaped in the quadrant of a sphere pivoted transversely of the blade and means for operating said shell, a similarly curved ejector plate slidable on the blade and located normally within said shell, and means for actuating said ejector plate.

5. A rigid blade and handle, a transversely pivoted curved shell on said blade, a slide collar on the handle and a link pivotally connected to said collar and shell, an ejector plate located normally within the shell, a lever pivoted in the handle, and a reciprocable ejector bar connecting said lever and ejector plate.

6. In an ice cream dipper the combination of a blade having a handle rigidly connected thereto, a cutting shell pivoted on said blade, shell operating means longitudinally slidable over said handle and an ejector associated with said handle and blade to form an abutment during the cutting operation of the shell.

In testimony whereof I affix my signature.

FRED N. MARTIN.